Oct. 22, 1963　　　　A. M. HILL　　　　3,107,379
PIPELINE CLEANER PROPELLING CUP
Filed Aug. 20, 1959　　　　　　　　　　　2 Sheets-Sheet 1

ARTHUR M. HILL
INVENTOR:

BY: *L. O. Goodwin*
ATTORNEY

Oct. 22, 1963  A. M. HILL  3,107,379
PIPELINE CLEANER PROPELLING CUP
Filed Aug. 20, 1959  2 Sheets-Sheet 2
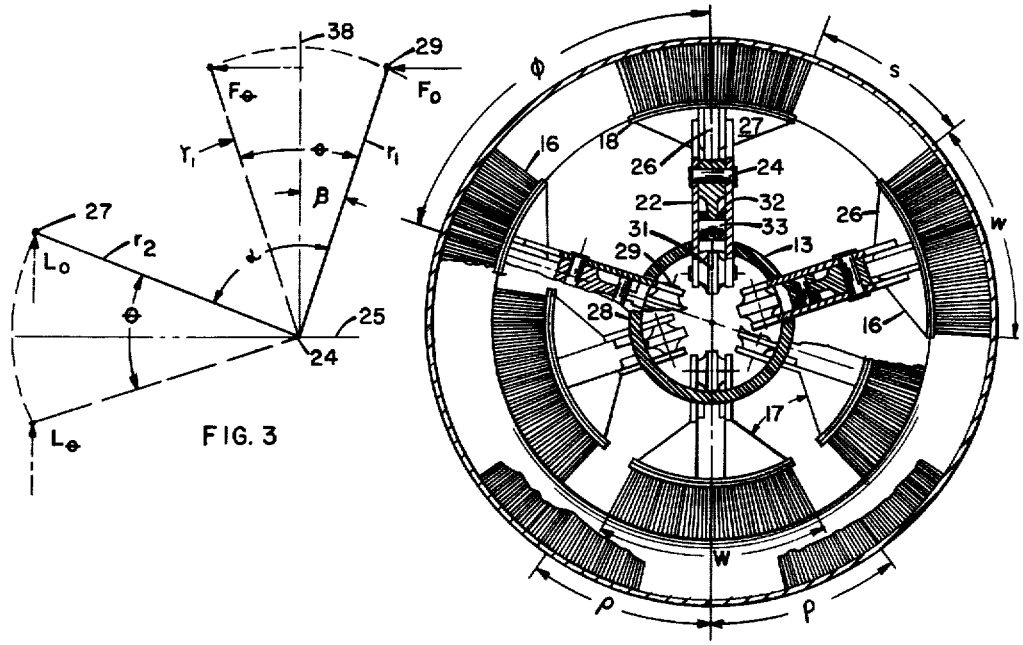
FIG. 3
FIG. 2
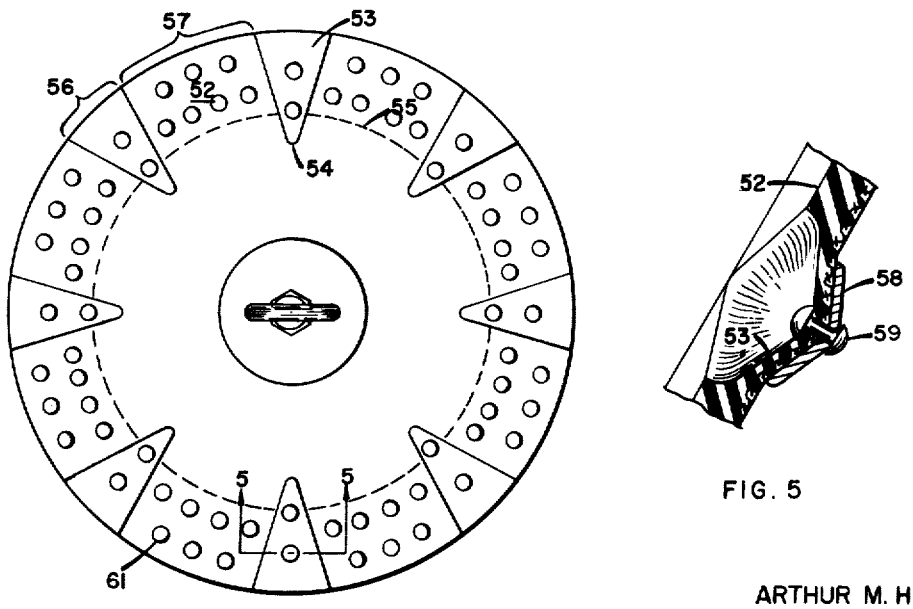
FIG. 4
FIG. 5
ARTHUR M. HILL
INVENTOR:
BY: Goodwin
ATTORNEY

United States Patent Office 3,107,379
Patented Oct. 22, 1963

3,107,379
PIPELINE CLEANER PROPELLING CUP
Arthur M. Hill, Tulsa, Okla., assignor to Service Pipe Line Company, Tulsa, Okla., a corporation of Maine
Filed Aug. 20, 1959, Ser. No. 835,039
4 Claims. (Cl. 15—104.06)

This invention relates to an apparatus for cleaning a pipeline. More particularly, this invention relates to a self-propelled apparatus for brushing and/or scraping the internal walls of a combination pipeline. This application is directed to a pipe cleaning device of the type disclosed in co-pending application S.N. 665,388, filed June 13, 1957, now U.S. Patent 2,958,884.

Pipelines, particularly cross-country oil pipelines, become dirty and inefficient due to the deposition of paraffin, dirt, and scale on the internal wall of the pipe. It has been the practice for many years to clean these pipelines by pumping a self-propelled cleaner through the line, the cleaner being provided with brushes, knives, or the like for scraping the wall of the pipe and with one or more cups or pistons which fit in and form a fluid seal with the pipe and propel the cleaner along the pipeline with the fluid flowing therein. To efficiently operate a long cross-country pipeline where there are spaced laterals, i.e., fluid inlets along the line, it is highly desirable that the area of the pipeline be increased from time to time. Variable diameter or combination pipeline cleaners having been unavailable in the past, it has been necessary to use different pipeline cleaners for sections of the pipeline having different diameter pipe. At any point in the system at which the size of the pipeline changes, it has, therefore, been necessary to provide trap facilities for removing one pipeline cleaner of the appropriate size for the upstream pipeline and for injecting another pipeline cleaner of the appropriate size to clean the downstream pipeline. Installation of such trap facilities and servicing, usually at remote points in the system, have been found to be too costly for economic and efficient operation of a cross-country pipeline.

It is, therefore, an object of this invention to provide an improved apparatus for cleaning combination pipelines. A more specific object of this invention is to provide a self-propelled pipeline cleaner having a propelling cup adapted to form a fluid seal in pipes of quite different diameters and have cleaning devices such as brushes or knives which exert a substantially uniform force or load on the wall of such pipes to remove deposits therefrom. Other objects of the invention will become apparent from the following description wherein reference will be made to the accompanying drawings in which:

FIGURE 2 is a cross-sectional view taken on line 2—2 of FIGURE 1;

FIGURE 3 is a diagram of forces showing the relationship between the load on the cleaning brushes and the force of an axially disposed spring within the pipeline cleaner shown in FIGURE 1;

FIGURE 4 is a plan view taken from the front of the propelling cup of the pipeline cleaner shown in FIGURE 1; and FIGURE 5 is a cross-sectional view of part of the propelling cup taken on lines 5—5 of FIGURE 4.

Figure 1:
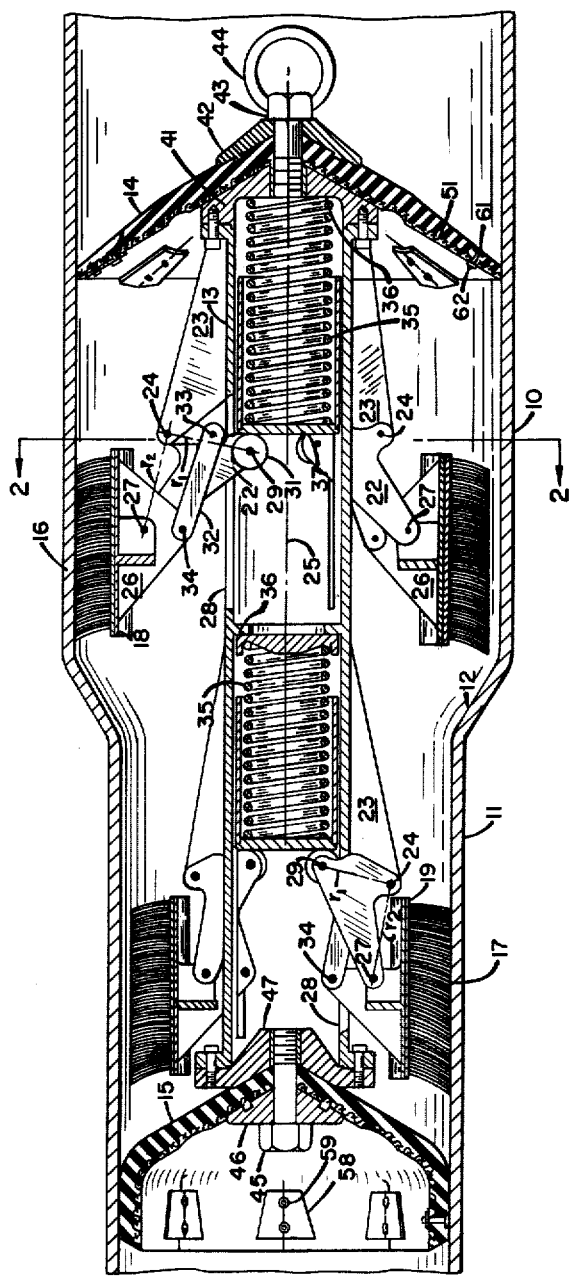
FIGURE 1 is a cross-sectional view of a combination self-propelled pipeline cleaner assembly.

In brief, this invention may be described as a pipeline cleaner having variable-diameter propelling cups and resiliently mounted brushes which permit the device to be propelled by the fluid in combination pipelines having a substantial variation in diameter, i.e., having in series line pipe of different standard sizes. The propelling cup, which forms a fluid seal in different pipelines or in combination pipelines having substantial variations in pipe diameter, is an important element of this invention. This cup, in combination with brushes which exert a substantially uniform force against the pipe regardless of major changes in diameter throughout the system, permits the cleaning of long sections of a cross-country pipeline regardless of these changes in pipe size.

Reference will now be made to FIGURE 1 of the drawings for a more detailed description of a preferred embodiment of this invention. For convenience, and to better understand the operation of the pipeline cleaner in combination pipelines, the front part of the cleaner is shown in a large diameter pipe 10 and the rear part of the cleaner is shown in a smaller diameter pipe 11 which is connected by a swage 12 to the large diameter pipe 10. The cleaner consists generally of an axial tubular body 13 on which are mounted a front propellent cup 14, a rear propellent cup 15, a forward peripherally segmented brush 16 and a peripherally segmented rear brush 17. These brushes are longitudinally spaced so that the trailing end 18 of the front brush never contacts or overlaps with the leading end 19 of the rear brush 17. Throughout the complete range of movement of the two brushes there is no interference therebetween which would prevent either of the brushes from contracting to fit the smallest pipe in the system. Similarly, as indicated more clearly in FIGURE 2, the front brush is rotated with respect to the rear brush so that the brush segments in one are aligned with the openings in the other to provide complete circumferential coverage of the pipe. The brush segments in each brush are wide enough peripherally as indicated by the dimension $w$ in FIGURE 2 so that the segments in each brush cover at least half and preferably more than half of the circumference of the larger of the two pipes and so that the complete circumference of the larger pipe is covered by the segments of both brushes. These segments are also narrow enough to leave sufficient space S therebetween so that the brush can be compressed radially into the smaller pipeline without interference between brushes. This size relationship can be summarized as follows:

$$Nwn \gtreqless C > c \gtreqless wn$$

where:

$N=$number of longitudinally spaced brushes;
$w=$peripheral width of each brush segment, in inches;
$n=$number of segments per longitudinally spaced brush;
$C=$internal circumference of largest pipe, in inches; and
$c=$internal circumference of smallest pipe, in inches.

There are generally several, e.g., 4–6 or more, typically about 5 segments in each brush as indicated in FIGURE 2 so that major variations in pipe diameters do not materially affect the load or bearing pressure exerted by each of the bristles 21 in any one brush segment. The segments are equally spaced at an angle $\phi$ which is equal to $360°/n$. The rotational displacement in degrees $\rho$ between the forward brush 16 and the rear brush 17, or between any brush and only one other brush, is equal to $\phi/N=360/Nn$. Where, as is the usual case, there are two brushes, the rotational displacement in degrees is $180/n$. For example, with 5 segments in each of 2 brushes, the angle between each segment is 72° and the rotational displacement between the front and rear brushes is 36°.

An important element is the method of mounting each of the brush segments on the body 13 to provide a relatively constant brush load. A preferred embodiment of the mounting will now be described. Each of the brush segments is rotatably mounted via a hinge arm 22 on hinge anchor 23 which is connected to or forms a part of the body 13. The hinge arm is connected to the hinge anchor by and rotates on pin 24, preferably in a plane which passes through the axis 25 of the cleaner. Likewise, each brush segment is replaceably connected to a brush holder 26 which is rotatably mounted via pin 27 on its respective hinge arm. Each of the hinge arms extend radially inward from this pin through a slot 28 in the body to a pin 29 on which is mounted a roller 31. Each hinge arm thus forms a compound linkage having one arm $r_1$ extending between pins 24 and 29, and another arm $r_2$ extending between pins 24 and 27. Both arms rotate about the anchor pin 24. A bar 32 connected to the hinge anchor 23 by a pin 33 and to the brush holder 26 by a pin 34 forms with the arm $r_2$ a parallelogram which holds the face of each of the brush segments parallel with the axis 25 so that the brush segments are worn evenly, i.e., so that the leading edge of each brush segment does not wear more rapidly than the trailing edge. The brush segments are urged outwardly by compression springs 35 which abut at the forward ends against shoulders 36 on the body. Each of these springs acting through a plate 37 at the rear exerts a force against rollers 31 which is then transmitted via the hinge arms 22 and the brush holders 26 to the brush segments.

The force exerted by each of these springs at various points along the path of travel of pin 29, the dimensions of the hinge arms $r_1$ and $r_2$, and the angle between these arms are important elements in producing a substantially uniform load on each of the brush segments regardless of the wear on the brushes and of variations in pipe sizes within the pipeline through which the cleaner is propelled. Reference will now be made to FIGURE 3 for an explanation of the correlation between the various dimensions and angles of a preferred arrangement of parts. In this figure, the arms $r_1$ and $r_2$ are shown in the original position in solid outline in the same relative positions as they occupy when the cleaner is in the smaller diameter pipe 11 (see FIGURE 1). In this arrangement, the spring 35 exerts an original force $F_0$ against the pin 29. This force tends to rotate the arms $r_1$ and $r_2$ counterclockwise about anchor pin 24 and to apply a load $L_0$ to the surface of the pipe through each of the brush segments via pin 27. As the bristles 21 of the brush segments wear and as the cleaner moves into a pipe of larger diameter, springs 35 rotate the hinge arms $r_1$ and $r_2$ counterclockwise to a new position as indicated in dotted outline which is at an angle $\theta$ relative to the original position. Since the force exerted by each of the springs decreases lineally with distance, the force $F_\theta$ exerted on pins 29 by the spring at the new or expanded position is less than the original force of the spring $F_0$. As will be shown hereinafter, however, by properly designing the angle $\alpha$ which is the angle in degrees between arms $r_1$ and $r_2$, and the angle $\beta$ which is the original angle in degrees between arm $r_1$ and a line 38 perpendicular to the longitudinal axis 25 of the cleaner, the load $L_\theta$ at any angle $\theta$ can be substantially uniform over a very wide range, e.g., 30–65° or more and will be nearly equal to $L_0$. The general relationship of parts to produce this uniform load $L_\theta$ at any angle $\theta$ on the brushes is represented by the following equation wherein $k$ represents the spring constant of spring 35 in pounds per inch and $n$, as indicated above, represents the number of segments per brush:

$$L_\theta = \frac{r_1 \cos(\beta+\theta)}{nr_2 \sin(\alpha-\beta+\theta)}[F_0 - kr_1[\sin\beta - \sin(\beta-\theta)]]$$

By designing the cleaner so that the angle $\theta=2\beta$ the brush force while the arm $r_2$ is in its initial position $L_0$ will be the same as when arm $r_2$ is in the completely extended position $L_\theta$. Imposing this condition reduces the above equation to the simple form $$k = \frac{F_0 \cot \alpha}{r_1}$$

wherein the required value for $k$ can be determined by assigning workable values to $F_0$, $\alpha$, and $r_1$. A well balanced phase relation between $\alpha$, $\beta$, and $\theta$ has been achieved in actual application of this formula by designing so that $\alpha$ is between about 100 and 130°, preferably about 100–105°, and $\beta$ is in the range of about 20–90°, preferably in the range 30–40°. As an example of the actual design values for two combination cleaners, the following Table I is presented:

*Table I*

|  | 8″–12″ Cleaner | 12″–16″ Cleaner |
|---|---|---|
| $F_0$ ........ pounds.. | 114 | 118.5 |
| $k$ ........ pounds/inches.. | 9.61 | 10.86 |
| $\alpha$ ........ degrees.. | 100.17 | 105.05 |
| $\beta$ ........ do.. | 34 | 32.5 |
| $r_1$ ........ inches.. | 2.125 | 2.938 |
| $r_2$ ........ do.. | 2.781 | 2.969 |
| $n$ ........ | 4 | 5 |

The resultant brush load $L_\theta$ remains relatively constant throughout the hinge arm travel for both cleaners as indicated in the following Table II:

*Table II*

8″–12″ CLEANER

| Pipe Size | $\theta$ in degrees | $L_\theta$ in pounds |
|---|---|---|
| 8 in | 0 | 19.8 |
|  | 10 | 19.9 |
|  | 20 | 19.7 |
|  | 30 | 19.8 |
|  | 34 | 19.8 |
| 12 in | 42.5 | 19.6 |
|  | 50 | 19.6 |
|  | 60 | 19.6 |
|  | 68 | 19.8 |

12″–16″ CLEANER

| Pipe Size | $\theta$ in degrees | $L_\theta$ in pounds |
|---|---|---|
| 12 in | 0 | 20.6 |
|  | 10 | 20.8 |
|  | 20 | 20.8 |
|  | 30 | 20.7 |
|  | 40 | 20.5 |
| 16 in | 42.5 | 20.5 |
|  | 50 | 20.4 |
|  | 60 | 20.5 |
|  | 65 | 20.6 |

Table II illustrates that the brush loading $L_\theta$ in these two combination cleaners is maintained virtually constant through a range of 3 standard American Petroleum Institute (A.P.I.) line pipe sizes, viz., nominal 8, 10, and 12 inch A.P.I. line pipe in the first case and nominal 12, 14, and 16 inch in the latter case. In some cases, I have found that this range can be extended even further. For example, a cleaner has been made for and run through a combination pipeline having standard A.P.I. line pipe with nominal sizes varying from 18 inch through 20 inch, 22 inch and 24 inch.

Propelling cups 14 and 15, as indicated previously, are mounted concentrically, preferably at the fore and aft ends of the body 13, respectively. The front cup 14 is clamped between the front head 41 of the body and a conical plate 42 by an eyebolt 43 which is threaded into the head. This eyebolt provides an eye or ring 44 for attachment of a lead line for dragging the cleaner through pipe or otherwise for handling the cleaner when it is out of a pipeline. Similarly, the rear propelling cup 15 is concentrically connected by a bolt 45 and conical washer 46 to the conical rear end 47 of the body. A rear view of these two propelling cups which are preferably identical is shown in an expanded position in FIGURE 4. The section of the propelling cups shown in FIGURE 5 is along the line 5—5 shown in FIGURE 4.

These propelling cups are preferably flexible or yieldable conical shells, sometimes referred to herein as "cones." The angle of the cone typically varies from about 90° to about 150°. It is preferably about 120°, as shown. The maximum diameter of the cups at the base of the cone is at least as great as the diameter of the largest pipe 10 in which the cleaner operates. To allow for a nominal amount of wear, the cups may sometimes have a diameter greater, e.g., ¼–1 inch greater, than the internal diameter of the largest pipe in which the cleaner operates. The resilience of each of the cups, i.e., its ability to deform under pressure, depends upon its thickness and hardness of the material from which the cup is made. The two criteria are (1) that it is sufficiently rigid to propel the cleaner through a pipeline, and (2) that it is sufficiently flexible and resilient to be deformed temporarily so that it will pass through and seal in the smallest pipe in the combination pipeline. Sometimes it is necessary to arrive at these limits by trial and error but, typically, the cones have a thickness varying from about ½ to 1½ inch and the thickness generally increases as the diameter increases, the thinner cones being used in the smaller pipelines, e.g., 8–12 inch, and the thicker cones being used in the larger pipelines 24–36 inch. The hardness of the material not only affects the stiffness of the cup but its resistance to abrasion. A hardness of about 70–75 durometer has been found satisfactory. It is generally desirable to reinforce the resilient material, which is typically neoprene, Hycar or some other oil resistant resilient material, with one or more layers of a fabric inner cone 51. This fabric may be cemented to the main body of the resilient material but preferably it is cast with the resilient material to form a unitary structure.

It has been found that a conical shell type of cup having sufficient thickness to withstand the differential pressure necessary to propel the cleaner cannot be compressed into a line pipe substantially smaller than the normal diameter of the cone without forming folds in the cup which allow too much fluid bypass for the fluid to propel the cleaner. It is, therefore, an important element of this invention that there is in the periphery or skirt of these conical propelling cups a series of inwardly deformable substantially equally spaced ribs 52 which are segments of the conical shell symmetrical about planes which include the axis of the cone. Interspersed between these ribs are triangular or sector-shaped webs 53. The webs are formed by casting recesses in the resilient material forming the outside or leading surface of the cups so that the fabric inner cone 51 and only a small amount of the resilient material form the flexible web. As to the size of the sector-shaped webs, they extend radially from the periphery of the cup toward the apex of the cone at a point 54 which is well within, e.g., ½–3 inches within, the radius of the smallest pipe 11 in which the cleaner operates indicated by the dashed radial line 55. The peripheral length 56 of each of the webs is such that the total length of all is equal to, or slightly greater than C—c, the difference in circumference between the largest pipe and the smallest line pipe in which the cleaner operates. Similarly the peripheral length 57 of each of the ribs 52 is such that the total length of all is substantially equal to, but less than the circumference c of the smallest line pipe in which the cleaner operates. It can be seen, therefore, that in an expanded position the sum of the peripheral lengths of all webs and ribs is substantially equal to the circumference C of the inside of the largest pipe in which the cleaner operates. A cross section of a preferred web taken at a mid-point radially is shown in FIGURE 5. The web, which is at the backside of the conical cup, has an initial set or deformation rearward, i.e., away from the apex, to cause it to fold backward when the cup is compressed as by going from a large diameter pipe into a smaller diameter pipe. This pre-set may be placed in the web during casting by incorporating preformed steel stays therein. In the prefererd embodiment a frustro-triangular metal plate 58 which corresponds in size generally with the web is bent on the center line to form a flat V and connected at the center by two or more bolts or rivets 59 to the center of the web. These plates prevent the pressure behind the cup from deforming the relatively flexible web forward so that it is folded between the ribs when the cup is compressed into line pipes smaller than the nominal diameter of the cup. Wear studs 61, typically of metal, are desirably set at spaced points in the ribs of each cup near the periphery and at points of maximum wear to retard wear on the ribs as the cleaner is driven through pipe smaller than the nominal or extended diameter of the cup. These wear studs may be cast in the wall of the cup, but preferably they are connected as by rivets 62 extending through holes in the walls of the cup.

Manifestly, the variable diameter pipeline cleaner described above is subject to a wide variety of embodiments, the embodiment described in detail being given for the purpose of illustration. This invention should, therefore, be construed not to be limited by the above description, but should be construed to be limited only by the scope of the appended claims.

I claim:

1. A variable diameter cup for propelling a cleaner through a combination pipeline having pipe of more than one diameter comprising a resilient shell of a cone having a base dimension at least as great as the inside diameter of the largest pipe in said pipeline, equally spaced flexible ribs in the skirt of said cone, said ribs being integrally formed with substantially sector-shaped webs connecting said ribs, each of said ribs being substantially symmetrical about a plane which includes the axis of said cone, said ribs having substantially parallel sides and being sufficiently yieldable to be compressed inwardly and permit said cup to enter coaxially the smallest pipe in said pipeline, the sum of the circumferential lengths of all said ribs when said cup enters said small pipe being substantially equal to but less than the internal circumference of said smallest pipe, said webs being substantially more flexible than said ribs, and means to indent said ribs inwardly of said cone.

2. A variable diameter cup for propelling a cleaner through a combination pipeline having pipe of more than one diameter comprising a resilient conical shell having a base dimension at least as great as the inside diameter of the largest pipe in said pipeline, substantially equally spaced, substantially sector-shaped recesses in the outer surface of the skirt of said shell, said recesses being symmetrical about planes which include the axis of said shell, the apexes of said recesses being spaced radially from said axis of said shell by a distance less than the radius of the smallest pipe in said pipeline, thereby forming ribs and integrally formed webs in the skirt of said shell, the sum of the circumferential lengths of all of said ribs when compressed into said smallest pipe being substantially equal to, but less than, the internal circumference of said smallest pipe, and means to indent said webs inwardly of said shell so that when said cup passes from one pipe into a smaller pipe said webs fold inwardly of said shell.

3. A variable diameter cup for propelling a cleaner through a combination pipeline having pipe of more than one diameter comprising a resilient shell of a cone having a base dimension at least as great as the inside diameter of the largest pipe in said pipeline, equally spaced flexible ribs in the skirt of said cone, said ribs being integrally formed with substantially sector-shaped webs connecting said ribs, each of said ribs being substantially symmetrical about a plane which includes the axis of said cone, said ribs having substantially parallel sides and being sufficiently yieldable to be compressed inwardly and permit said cup to enter coaxially the smallest pipe in said pipeine, the sum of the circumferential lengths of all said ribs when said cup enters said small pipe being substantially equal to but less than the internal circumference of said smallest pipe, said webs being substantially more flexible than said ribs, and said ribs being inwardly indented in the normally unstressed position of said cup.

4. A variable diameter cup for propelling a cleaner through a combination pipeline having pipe of more than one diameter comprising a resilient conical shell having a base dimension at least as great as the inside diameter of the largest pipe in said pipeline, substantially equally spaced, substantially sector-shaped recesses in the outer surface of the skirt of said shell, said recesses being symmetrical about planes which include the axis of said shell, the apexes of said recesses being spaced radially from said axis of said shell by a distance less than the radius of the smallest pipe in said pipeline, thereby forming ribs and integrally formed webs in the skirt of said shell, the sum of the circumferential lengths of all of said ribs when compressed into said smallest pipe being substantially equal to, but less than, the internal circumference of said smallest pipe, said webs being inwardly indented in the normally unstressed position of said cup.

References Cited in the file of this patent

UNITED STATES PATENTS

| Re. 22,054 | Sharp et al. | Mar. 24, 1942 |
| 1,035,994 | Mueller | Aug. 20, 1912 |
| 1,593,072 | Haydock et al. | July 20, 1926 |
| 2,552,339 | Moon | May 8, 1951 |
| 2,640,213 | Robinson | June 2, 1953 |
| 2,875,525 | Fredd | Mar. 3, 1959 |
| 2,957,189 | Nelson et al. | Oct. 25, 1960 |
| 2,958,884 | Hill et al. | Nov. 8, 1960 |

FOREIGN PATENTS

| 59,538 | Germany | Nov. 2, 1891 |
| 676,776 | Germany | June 10, 1939 |
| 828,173 | Germany | Jan. 17, 1952 |

OTHER REFERENCES

T. D. Williamson Co. Bulletin A-450; copyright 1954 (publication).

UNITED STATES PATENT OFFICE
CERTIFICATE OF CORRECTION

Patent No. 3,107,379            October 22, 1963

Arthur M. Hill

It is hereby certified that error appears in the above numbered patent requiring correction and that the said Letters Patent should read as corrected below.

Column 3, lines 64 and 65, for that portion of the equation reading "$(\beta+\Theta)$" read -- $(\beta-\Theta)$ --.

Signed and sealed this 28th day of April 1964.

(SEAL)
Attest:

ERNEST W. SWIDER
Attesting Officer

EDWARD J. BRENNER
Commissioner of Patents